Jan. 6, 1948. J. J. MITCHELL 2,433,919
RODENT TRAP
Filed Aug. 21, 1944
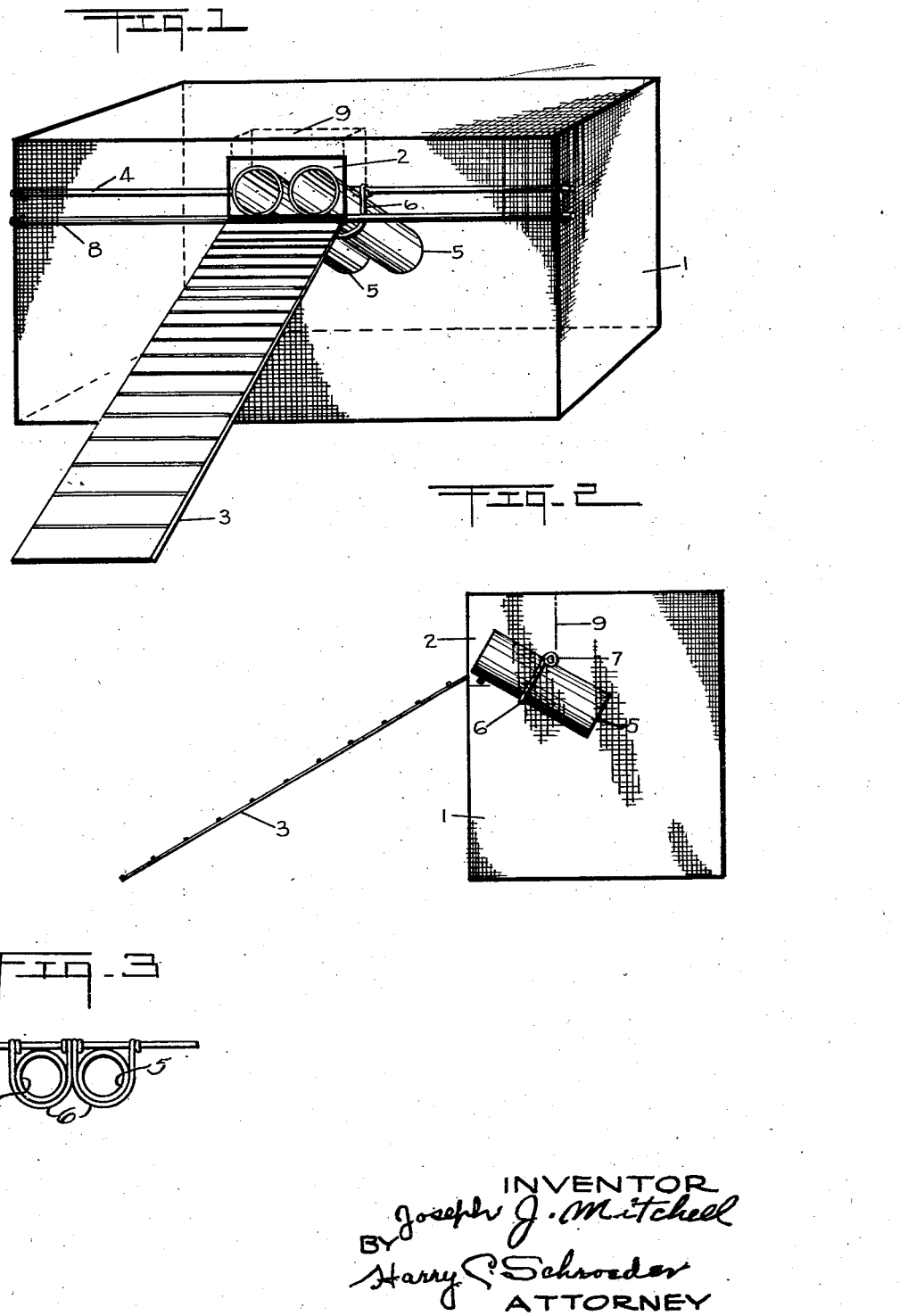

Patented Jan. 6, 1948

2,433,919

UNITED STATES PATENT OFFICE 2,433,919

RODENT TRAP

Joseph J. Mitchell, Oakland, Calif.

Application August 21, 1944, Serial No. 550,438

1 Claim. (Cl. 43—69)

This invention relates to rodent traps; the main object being to provide a trap for the purpose which needs no setting, requires little bait, and is positive in its action in not only trapping the rodents but in subsequently preventing their escape.

In the drawings:

Fig. 1 is a perspective view of the trap.

Fig. 2 is an end elevation of the same.

Fig. 3 is an end elevation of the chutes.

Referring to the characters of reference on the drawings, the trap comprises a rectangular cage 1 of wire screening, having an opening 2 in the front near the top and to which a ramp 3 leads.

Mounted in the cage and extending from end to end thereof, a short distance above the bottom level of opening 2 is a rod 4 from which closely spaced open ended and smooth surface tubes 5 are suspended for independent swinging movement by means of yokes 6 secured about the tubes intermediate their ends and having eyes 7 engaging the rod.

The tubes form chutes to guide the rodents and extend into the cage, downwardly and inwardly from the front of the box in line with opening 2. The lowest portions of the peripheries of the tubes are normally maintained on a level with the bottom of the opening and close to the same (and to the upper end of the ramp) by another rod 8. The last mentioned rod is mounted in the cage in front of and parallel to rod 4, but in a lower horizontal plane than that of the rod 4. The upper ends of the tubes 5 normally rest against said rod 8, so as to limit tilting movement of the tubes toward the front of the cage.

By placing the yoke 6 slightly nearer the lower ends of the tubes 5, the latter are hung so that they are then disposed with a downward slope toward the rear of the cage and are nearly overbalanced so that any appreciable weight in the tubes rearwardly of the point of hanging will cause them to tilt even further and assume an almost vertical position.

A curtain 9 in the cage extends back from the sides of opening 2 and across at the rod 4 so as to close the opening from within the cage about to the sides of the tubes.

In operation, bait is sprinkled in the tubes, and any rodent, attracted by the bait and ascending the ramp and then entering either tube, almost immediately passes the center of gravity thereof. The tube, being overbalanced, tilts downwardly and the rodent slides out and is discharged into the cage below the tube, which being relieved of its weight, at once reassumes its normal position. If the rodent attempts to reenter the tube by jumping or climbing to the same, the tube will immediately tilt again, frustrating any attempt of the rodent to reenter the tube and escape. Such frustration is aided by the smooth surface of the tubes, which provides no foothold for the rodents.

I claim:

In a rodent trap, a cage having an opening in one wall thereof, a supporting rod in said cage disposed rearwardly of said opening and between the top and bottom thereof, a guide member comprising a straight tube open at both ends, a yoke supporting said tube and having its ends rotatably engaging said supporting rod, said yoke disposed nearer to one end of said tube than the other whereby said tube is supported in unbalanced relationship, the shorter end of said tube normally disposed adjacent to said opening, and a limiting rod in said cage adjacent to the lower edge of said opening; said last named rod supporting the shorter end of said tube against downward movement when the tube is in normal balanced position.

JOSEPH J. MITCHELL.

REFERENCES CITED

The following references are of record in the file of this patent:

UNITED STATES PATENTS

| Number | Name | Date |
| --- | --- | --- |
| 662,279 | Lindsey | Nov. 20, 1900 |
| 829,607 | Sheridan | Aug. 28, 1906 |
| 1,635,224 | Rowley | July 12, 1927 |
| 100,779 | Lyman | Mar. 15, 1870 |
| 1,258,960 | Swain | Mar. 12, 1918 |
| 1,145,292 | Buck | July 6, 1915 |

FOREIGN PATENTS

| Number | Country | Date |
| --- | --- | --- |
| 66,718 | Germany | Jan. 16, 1893 |
| 633,277 | Germany | July 23, 1936 |